United States Patent [19]
Berner

[11] 3,895,086
[45] July 15, 1975

[54] METHOD AND APPARATUS FOR FORMING LAMINATED MOLDED BODIES

[76] Inventor: Erling Berner, 2890 Cavey Crest Cir., Allison Park, Pa. 15101

[22] Filed: Aug. 28, 1972

[21] Appl. No.: 284,059

[52] U.S. Cl. ............ 264/45.4; 264/46.4; 161/161; 425/4 C; 264/46.5; 264/46.2; 264/46.7
[51] Int. Cl. ........................................ B29d 27/03
[58] Field of Search ................................ 264/46, 47

[56] References Cited
UNITED STATES PATENTS

| | | | |
|---|---|---|---|
| 3,065,500 | 11/1962 | Berner | 264/53 |
| 3,285,796 | 11/1966 | McElhinney | 264/47 |
| 3,432,582 | 3/1969 | Bender | 264/47 |

Primary Examiner—M. J. Welsh
Attorney, Agent, or Firm—Sol B. Wiczer

[57] ABSTRACT

Laminated foamed product and method and apparatus in which a sheet is folded as a wrapper and filled with heat expandable plastic material and heated to expand the filler by passing heating fluid through perforations in the sheet.

31 Claims, 11 Drawing Figures

METHOD AND APPARATUS FOR FORMING LAMINATED MOLDED BODIES

This invention relates to a method and apparatus for forming laminated molded bodies comprising outer perforated surface sheets cohered to and confining foamed granular materials therebetween; and particularly, includes several improvements in the laminated and foamed plastic molding art, both in apparatus and process to rapidly form a laminated foamed molded product such as boards, in continuous foaming and molding of granular materials between confining sheets applied about the foamed granular materials.

As shown in applicant's prior U.S. Pat. No. 3,065,500, it is old to apply upper and lower unperforated laminated sheets to foamable plastic granules, steam being introduced by probes into and near the inlet of a molding channel lined with the laminated sheets. Steam condenses by this method in the body of the expanded beads and remains trapped as moisture confined in the board by the laminating surface sheets. It was proposed in that prior patent to apply perforations to the finished product to allow the moisture ultimately to escape by evaporation. Such evaporation process is slow, requiring substantial storage periods for weathering to remove the condensed moisture, and the product per se is insufficiently adhered to the confining surface sheets because the steam cannot flow for heat transfer evenly over the plastic particles being expanded as well as through the confining sheets as the product is being molded.

According to one aspect of this invention the sheets are perforated before applying to the surface whereby a heating fluid such as steam may be introduced through one or both of the outer surfaces and thence into the expandable granules confined between the perforated laminating sheets as the laminated product passes through the molding channel, thereby evenly heating and homogeneously expanding the granules into a foam as the heating medium passes through the product being continuously formed therein as the granules are evenly expanded, fully cohered throughout their mass to each other as well as to the confining sheets.

In a second improved phase of this invention a confining sheet is continuously folded into a wrapper enclosing both sides as well as top and bottom while it is filled with foamable granular material and which is heated and foamed as it is continuously formed and wrapped into a desirably shaped and molded body such as boards.

In a further aspect of this invention the outer confining sheet wrapper as applied is perforated to allow passage of a heating fluid through the confining molding channel or wall, whereby to admit a fluid heating medium passes through the wall and board as it is continuously formed, the perforations also allowing expulsion of the gaseous heating medium as well as moisture.

The wrapper or outer laminating layers allow the board to be compressed to desired thickness together with the foamed granules foamed in contact with the wrapper.

In still a further aspect of this invention the molding apparatus is improved whereby the laminating surface or wrapper may be used as a support member for the foam filled continuously molded board, to allow drawing of the molded product through the molding machine as it is heated, foamed and compressed to desired dimensions. Such use of the laminating sheet to support the molded product while it is formed allows the laminate layers per se to form the walls of the molding channel so that the metal plate or belts in common practice may be omitted if desired. The omission of belts in the molding machine is referred to as a no-belt machine. However, for additional support, and particularly where the product has upper and lower sheets, but is not wrapped to seal the sides, the known one-belt, or two-belt machines can be used as desired, either with a longitudinal or arcuate molding channel.

It is, accordingly, the object of this invention to provide a method and apparatus improved in these several aspects and the drawings and further description herein will be read as exemplary and illustrative thereof but not limiting.

Figure 1:
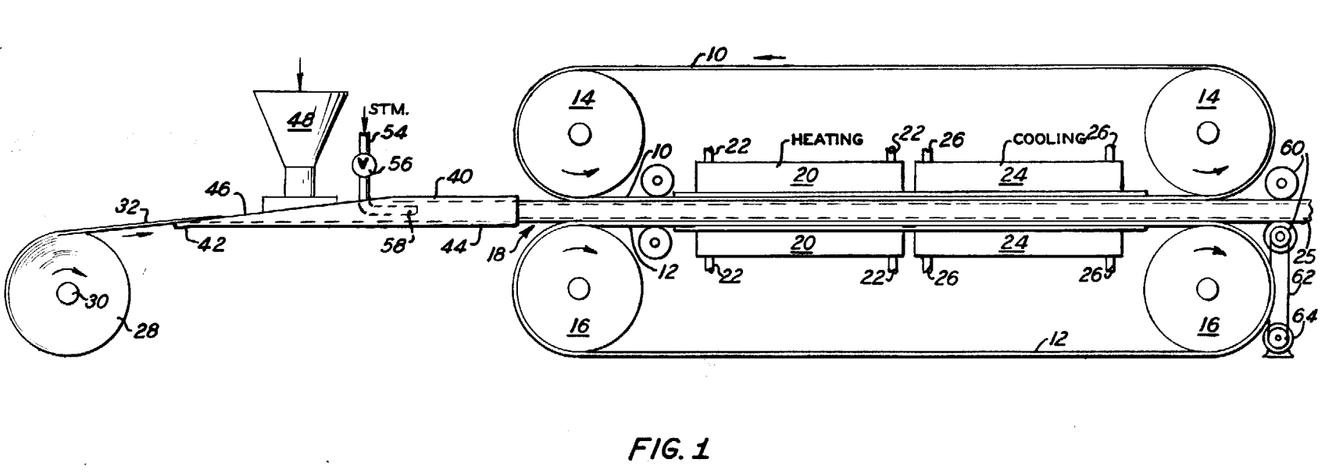
FIG. 1 shows a continuous molding using a perforated sheet wrapper in a two-belt machine of the longitudinal or linear molding type in side elevation.
Figure 2:
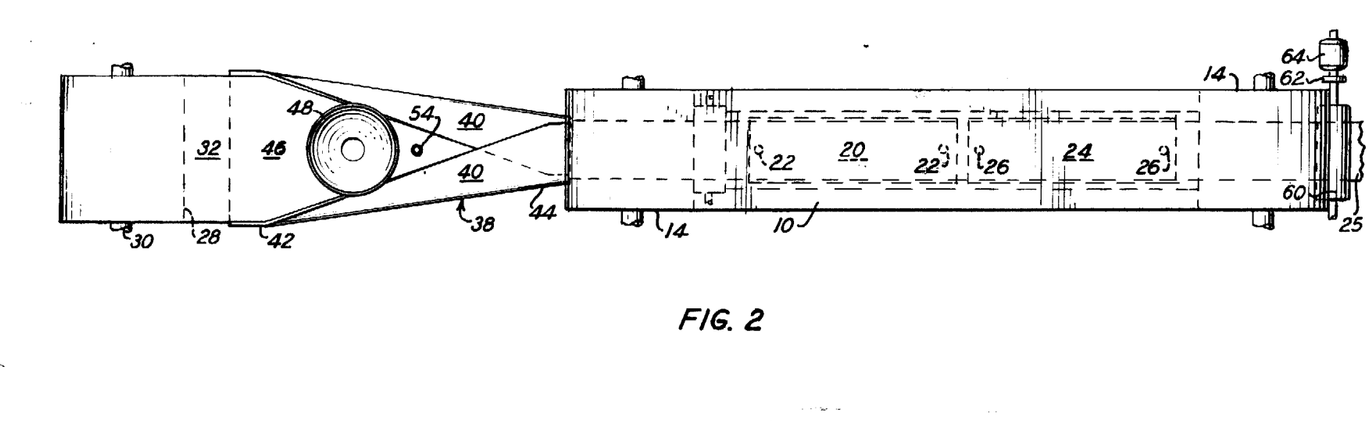
FIG. 2 is a top plan view of FIG. 1.

Referring to FIGS. 1 and 2, a two-belt longitudinal or linear molding machine comprises an upper perforated belt 10 and a lower belt 12 entrained at each and around rollers 14 and 16. The belts are mounted parallel to each other at adjusted spacing or to define a molding channel 18 therebetween. Movable or stationary side belts [not shown] are mounted to seal each side of the conveyor to form complete and seal therebetween the generally rectangular molding channel 18. Heating chambers 20 having open or perforated lower and upper surfaces are mounted above and below the molding channel to supply a heating medium such as stream entering through inlets 22 so that the steam may pass through the chambers 20, through the perforations in the belts 10 and 12, enter the molding channel and penetrate the product 25 being molded, the steam passing upstream thereof. Thus, all ducts 22 can lead steam into the heating chambers 20. Alternately, the heating medium may enter only through upper inlets 22, pass downwardly through the material being molded in the molding channel 18, and thence continuing downward through a lower chamber 20, may pass outward through the lower ducts 22, whereby the heating fluid passes in a single direction. The heating medium may equally well be passed into the lower heating chamber 20 and be removed from the upper chamber 20.

Downstream of the heating chamber in the direction of molding in the channel 18 is mounted cooling chambers 24 serviced by ducts 26 which serve to admit, allow circulation and withdrawal of a cooling fluid such as cold water from upper and lower chambers 24, or both. Alternately, the cooling chambers 24 may be merely vacuum chambers if suction is applied through ducts 26 leading to a vacuum suction means [not shown] to apply a reduced pressure upon the product being molded in the molding channel 18 and thereby remove steam and water vapors and supply a cooling effect thereto. A similar suction can be applied to the lower chamber to cool the product being molded from a lower vacuum chamber 24; or, as more usual, both upper and lower chambers 24 can serve to apply cooling by applied vacuum to both remove water vapors through the perforated belts 10 and 12 in both upper and lower directions. Obviously a third zone can be mounted in which one of the cooling zones operates by evaporation of moisture into a vacuum chamber, and the third zone operates by circulating cooling water therethrough, all mounted adjacent to the belts which are perforated to allow the application of a vacuum or transfer of cooling liquid by way of the chambers 24 mounted thereabove or below. Such structure is known in the art as shown in the patent to Norrhede at al., U.S. Pat. No. 3,383,441, as well as applicant's prior U.S. Pat. Nos. 3,065,500 and 3,427,372.

Figure 8:
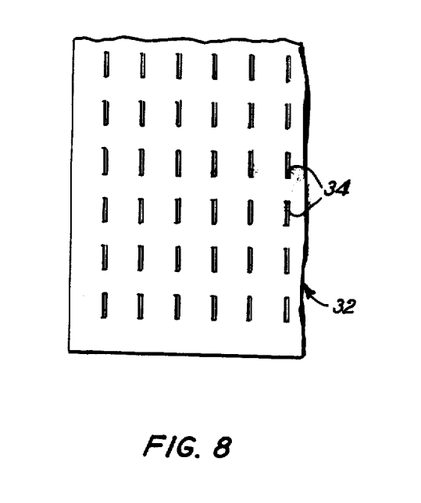
FIG. 8 is a detail showing the slotted perforations in an outer laminated material.
Figure 9:
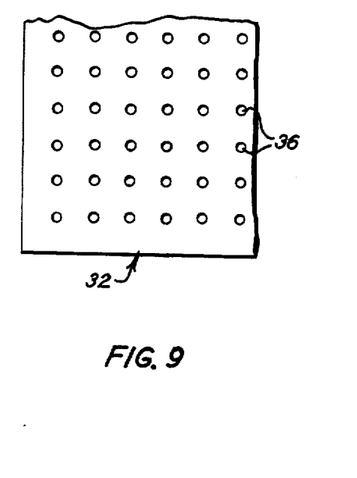
FIG. 9 is a detail showing round perforations in the outer laminating material.
Figure 10:
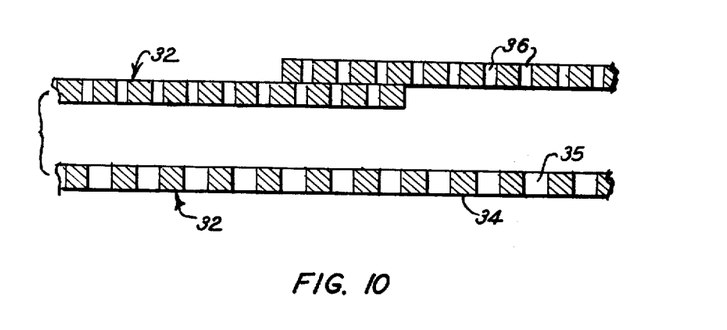
FIG. 10 is a detail showing large and small upper and lower board perforations, respectively.

A supporting roller 28 carrying a perforated sheet is mounted on a support axle 30 for unwinding in the direction of the arrows and supplies a sheet of laminating material 32 such as paper, metal, plastic or asbestos sheet, preferably perforated with large enough slots or holes to allow easy passage of heating or cooling fluid through the sheet surfaces. Such sheets are shown in FIGS. 7, 8, 9 and 10, and may have evenly spaced slots 34 as shown in FIG. 8 or they may be round perforations 36 as shown in FIG. 9. It is sometimes preferred to accommodate heating or cooling fluid flow through the laminated body to have larger openings 35, so that as shown in FIG. 10, the perforations in the sheet are arranged to have the smaller perforations disposed in the top surface and the larger perforations 35 disposed at the bottom surface.

Figure 7:
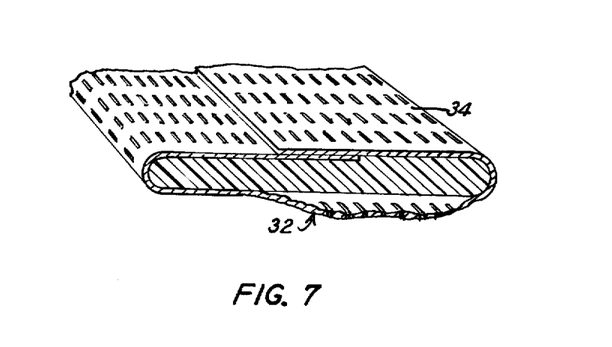
FIG. 7 is a detail showing the wrapped board.

As shown in FIGS. 1 and 2, a folding die 38 has side wings 40 folded angularly upward and crossing over each other while being disposed in an angularly inward taper from front to rear, whereby it is wide enough to accommodate entry of the sheet material 32 at the forward entry end 42 and, as it tapers toward the rear 44, forces the sheet to bend or bow upward and then fold, one edge meeting and passing over the other, as it reaches the after end 44 to be emitted there as a compressed, substantially rectangular tubular member of the sheet material having its original outer edges folded one over the other, as shown in FIGS. 7 and 10.

An open flat area 46 of the sheet remains as the sheet begins to fold, and at this point a hopper 48 is mounted to supply granular foamable beads of thermoplastic material such as polystyrene having a heat expanding agent. The hopper 48 has a lower valve plate 50 [FIG. 6a] which may be opened a selected distance sufficient to flow the beads onto the sheet 32 in quantity, which upon expanding by foaming with heat will fill the encapsulating sheet wrapper with the foamed granules. The star wheel 52 [FIG. 6a] is rotated by a means [not shown] to feed the beads at an adjusted rate to fill the tubular wrapper as it is formed. The hopper 48 as shown may be subdivided by a partition 49, dividing the volume into a main chamber 51 to which is supplied expandable beads and a chamber 53 to which is supplied ground scrap. The scrap chamber 53 is protected by a star wheel 55. Thus by rotation of star wheel 55 a selected amount of scrap material may be fed, together with expandable beads in the rotation of the feeding star wheel 52 for enclosure within the wrapper 32.

As shown in my prior patents, it is sometimes useful to expand the beads by applying steam from a probe 58 passed into the body of beads as they are supplied to the molding channel which can initially heat the same to pre-expand them to seal the mold channel, soften their surfaces for initial cohesion to each other as well as to seal the expanded beads to the confining laminating sheet. The preliminary heating with a probe 58 serves these several functions and is a useful adjunct to the main supply of heating fluid passed through the sheet perforations from a lateral source of heat such as from chambers 20 mounted adjacent to the upper or lower belt surfaces as shown in FIGS. 1 and 2, and usually through both surfaces of the molding channel. The lateral supply of heat through the surfaces of the molding channel is accommodated by the perforations in the belts as well as perforations in the laminating sheet materials; and this lateral source of heat may be all that is needed and the probes may be omitted. Where, of course, the sheets have not been perforated, the probes cannot be omitted. Thus the inclusion or omission of probes will depend upon whether the beads per se have been pre-expanded before supply to the hopper, or whether the beads have not been pre-expanded and the extra rapid supply of heat available from probes is needed. Another consideration for use of probes, in addition to supply of heat through heating means mounted along the molding channel and passed through the perforations of the laminating sheet, is whether it is desirable or useful to firmly cohere the beads to the laminating sheet, and in the absence of an extraneously supplied adhesive as shown, since the probes aid in that cohesion of beads with the laminating sheet.

The secondary supply of heating fluid such as steam is added through a probe duct 54 controlled by a valve 56, the lower end being bent as a probe 58 and entering the tube being formed by the wrapped sheet being bent, the probe entering the tube formed by the wrapper to soften and expand the beads therein with steam. The steam admitted through the probe 58 heats the granules to foam them and fill the wrapper as it is formed, the foamed, assembled and wrapped product passing outward of the die 38 as a rectangular board into the molding space 18 between the belts 10 and 12 for molding.

The laminated board may be further heated by heating fluid emitted through heating chambers 20 and then cooled by vacuum supplied through cooling chambers 24 or, alternately or in combination therewith both vacuum cooling and cooling fluid may be used to cool the wrapped board as it passes thereby through this cooling area. The board ultimately passes between rollers 60 driven by belts 62 and motors 64, the rollers 60 being spaced apart any selected distance which may be desired, such as to reduce the dimensions of the board. Equally important, the rollers 60 grip, frictionally engage and draw the laminated foamed board through the molding channel or forming die 38. This is made possible by the added strength of the reenforcing sheet as supplied about the foamed and molded granules. Such sheets will preferably and usually be thin perforated sheets of plastic which soften like the cohered and foamed granular filler. For various purposes the sheets may be of metal including very thin metal foil; or it may be of paper or asbestos.

Figure 6A:
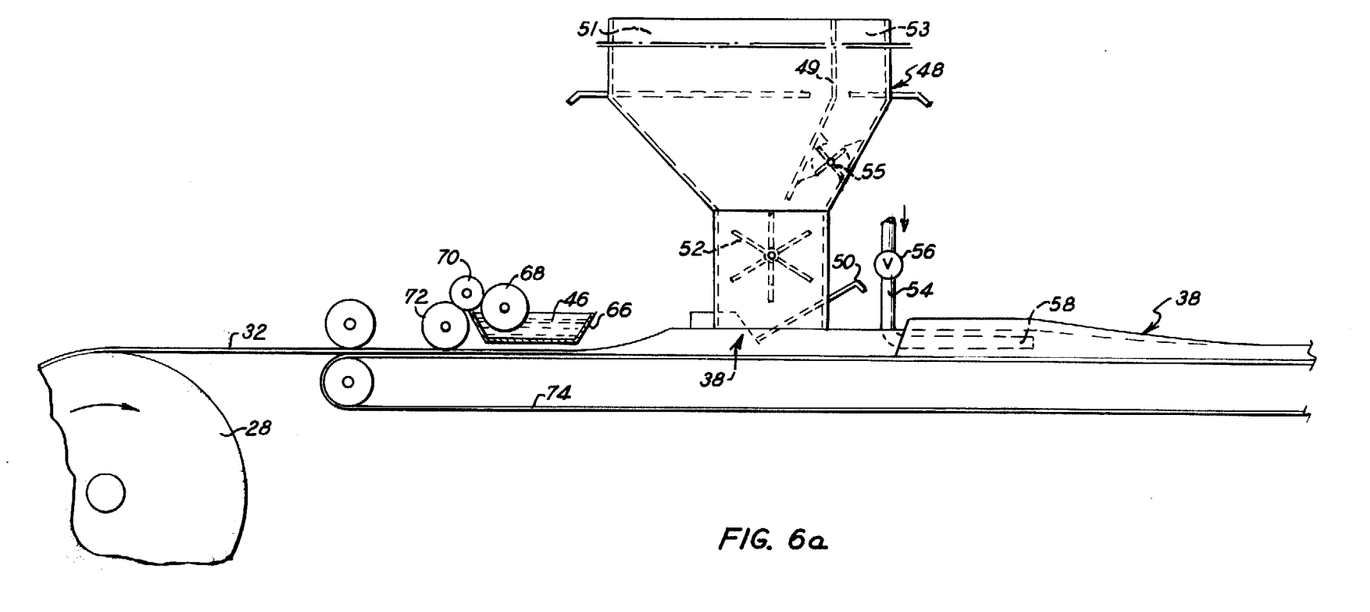
FIGS. 6a and 6b are longitudinal continuations of each other and show a molding machine having no belts using the laminated wrap as a molding channel.

As shown in FIG. 6, it may be useful to coat the sheet 32 with adhesive. For this purpose a pan 66 is partially filled with a supply of adhesive in which is mounted a roll 68 and which is slowly rotated to maintain its surface wet with adhesive. An intermediate roll 70 is mounted in contact with the surface of roll 68 to pick up a limited even supply of adhesive and transfer it to a coating roller 72 which in turn transfers it to the surface of the sheet 32 and which may adhere without additional adhesive before it is folded or wrapped around the granules as the foam.

As pointed out above, the use of adhesive may be omitted, particularly where the confining sheet is itself heat softenable to a tacky state such as where the sheet is formed of plastic and, as may often be preferred, it may be a sheet of pre-foamed plastic which softens for easy adhesion to the foamed granules with the heating medium supplied to the molding channel, as from probes, and preferably laterally introduced from one of the molding channel surfaces, and sometimes from both sources. That is, the heat may be from the steam probe as well as laterally introduced from the mold surfaces. Thus, where the pre-foamed sheet is heated together with the expanded granules by the heating fluid, they readily cohere in the molding channel and extraneously applied adhesive may not be needed.

As shown in FIGS. 7, 8 and 9, the steam may be introduced through elongated slots 34 on one or both surfaces of the outer wrap machine or through perforations 36 in one or both surfaces of the wrapping sheet. Any pattern of perforations may be used, but where the heating fluid is to be introduced laterally from one side of the molding channel, the heating fluid passing through the perforated layer and across the board as it is molded, passing outward through the lower perforated layer, it is useful to have larger perforations on the side through which the steam is emitted, larger than those on the opposite steam inlet side to cooperate for easy flow of the heating medium laterally across the board, easily entering through one surface and being emitted from the opposite by such sizing of the perforations to allow easy passage of the heating fluid into and out of the board being molded. Of course where the steam is introduced from both sides of the molding channel, then the size of perforations in both laminated board surfaces may be the same.

Figure 6B:
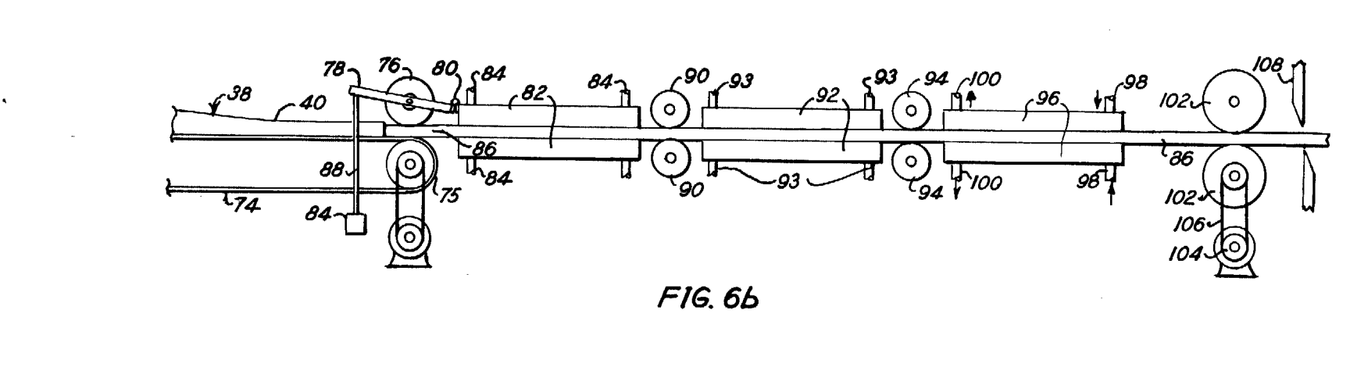

As shown in FIGS. 6a and 6b, the initial laminating sheet 32 is supplied to the surface of a conveyor belt 74 which supports and moves the sheet longitudinally toward the folding die 38 with or without coating by adhesive from coating roller 72. A requisite supply of beads are deposited in the sheet just as it is being folded by adjusting of valve plate 50 and rotation of star wheel 52 in the hopper 48 at a complimentary feed speed. The sheet and beads thereon are moved and supported upon a conveyor 74 at the forward end until they reach the folding die 38 and for a short distance after the sheet enclosed board leaves the folding die wings 40, as shown in FIG. 6b. In the die 38 the heat from the probes expands and softens the granules and these become tightly wrapped and encased as they cohere to each other and to the enclosing sheet. As the preliminarily enclosed or wrapped and at least partially foamed product 86 leaves the folding die 40, it is engaged and supported on the bottom by the after end 75 of the conveyor belt 74, and the softened product also passes through the nip of an upper cooperating tangential roller 76. The roller 76 is supported between a pair of pivoted beams 78, pivoted at 80 to the heater chamber or housing 82. A weight 84 is attached to the outer end of each beam 78 by a cable 88. The roller 76 is thus pressed by weight 84 upon the wrapped molded product 86, compressing it between the end 75 of the conveyor belt and roller 76, to a degree controlled by weights 84. However, the compaction by roller 76 is preliminary and is not enough to destroy or substantially inhibit easy flow of heating medium through the perforated sheet foamed board.

The board body 86 then passes by the upper and lower heating chambers 82, each of which is supplied by a heating fluid such as steam entering through inlets 84. The inner surface of the heating chamber 82 is perforated, whereby the heating fluid passes through the perforations thereof and thence through perforations 34 in the sheet 32 and into the molded granules for further heating thereof. The molded product may be further size reduced by passing through the nip of tangential rollers 90, or the rollers 90 may merely serve as frictional drive rollers to draw or move the laminated body longitudinally along its path, passing thence through a cooling chamber 92 in which a vacuum may be applied from a source [not shown], drawing the moisture out of the molded product through its perforations and through perforations in the contiguous walls of chambers 92 [not shown], the reduction of the pressure by application of suction through ducts 93 serving to cool the molded product substantially and this may be all the cooling that is needed.

The molded product 86 then passes further through guide rollers 94 again spaced a selected distance apart to operate either as a frictional drive upon the molded product to pass it along longitudinally, or to adjust the board thickness, or both, as desired. The molded product is then passed through a pair of cooling chambers 96 through which a cooling medium such as water may be flowed, entering each chamber 96 through each duct 98 and leaving through each respective duct 100 from each upper and lower cooling chamber 96. The inner surface of the chambers 96 may be imperforate such as to merely cool the board as it passes in frictional contact therewith.

The molded board 86 finally passes through a pair of tangential rollers 102, at least one of which is driven by a motor 104 by way of a belt 106, the rollers 102 being set apart a selected distance to frictionally engage the board 86 and move it longitudinally along its forming path, as shown. The rollers 102, 94 and 90 may also be set apart a selected distance to size reduce the molded product or board softened with heat to a selected thickness dimension. The molded product may then be cut by knives 108, operated in a manner known in the art, to sever the molded board intermittently into the selected lengths. Each of the rollers 94 and 90 may be equipped with a driving motor 104 and 106 if desired to speed up the movement of the board.

The surfaces of the stationary molding die 38 and the surfaces of the chambers 82, 92 and 96 in contact with the stationary surfaces of the chambers 82, 92 and 96 may each be coated with a friction-reducing lubricant substance such as polytetrafluoroethylene, commonly known as TEFLON, for ultimate reduction of friction between the stationary surfaces and the moving molded product to allow easy movement of the molded product therealong.

It will be seen that the product molded is moved by mechanically or frictionally gripping the molded product, at least by rollers 102, drawing it past the heating and cooling chambers after leaving the folding die 38 and may also be size-reduced to the thickness needed by rollers 86, 94 and 102 and all or one of more of these may supply the sole moving force applied to the molded product through the several treating stations i.e. wrapping, heating and cooling, as well as forming the product to desired dimensions as the product is drawn through these several treating and forming stations. Since the product is not supported upon belts, the device of FIG. 6 is hereinafter referred to as a 'no-belt' machine in contrast to that of FIGS. 1 and 2, hereinafter referred to as a 'two-belt' machine. However, for the supporting moving belt machines described below, a frictional gripping or drive may be optionally included or omitted to aid the belts moving the molded product through the molding channel. Thus, FIG. 1 as described above, a two-belt machine, optionally includes driving rollers 60 to aid the belts in moving the molded product through the channel 18.

Figure 3:
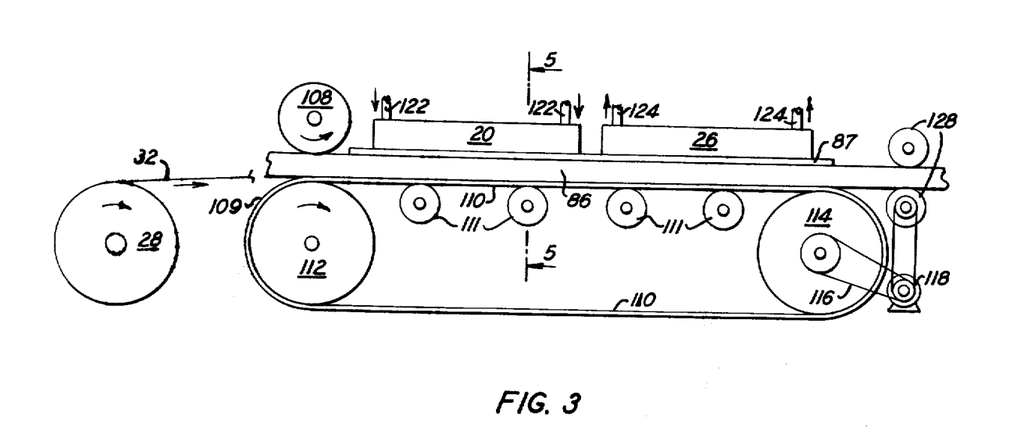
FIG. 3 shows a longitudinal one-belt machine in side elevation.
Figure 4:
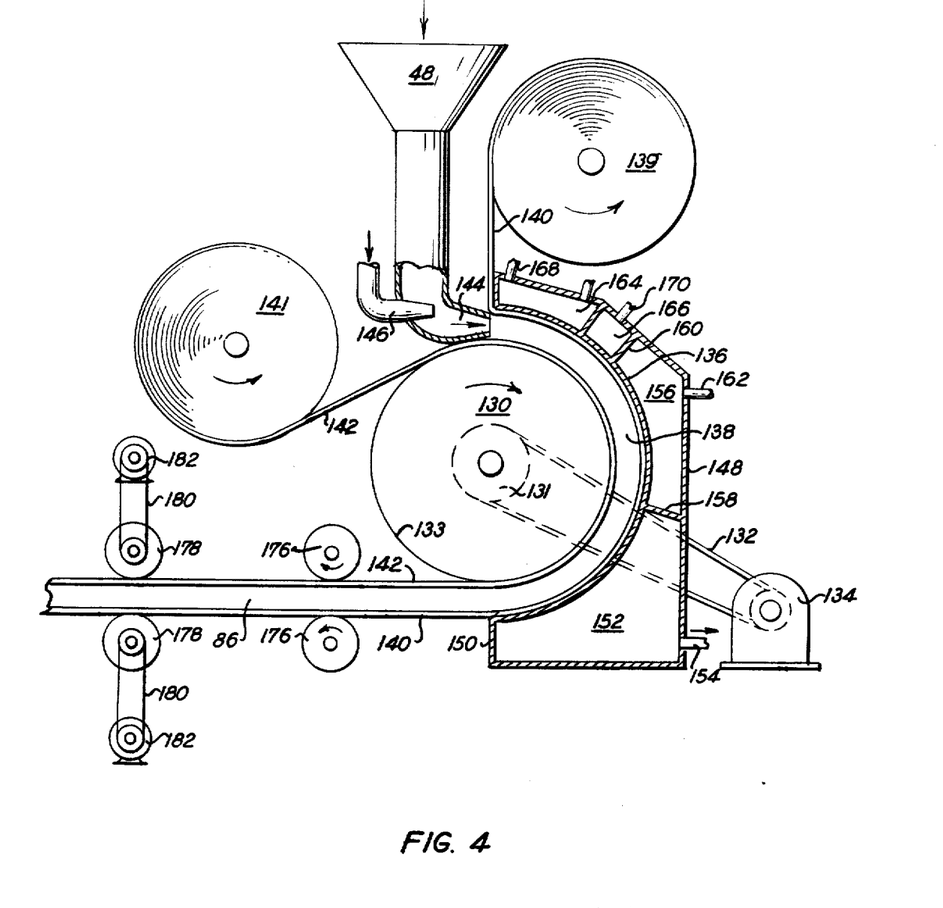
FIG. 4 shows an arcuate channel or wheel-type, one-belt molding machine having only one movable surface.
Figure 5:
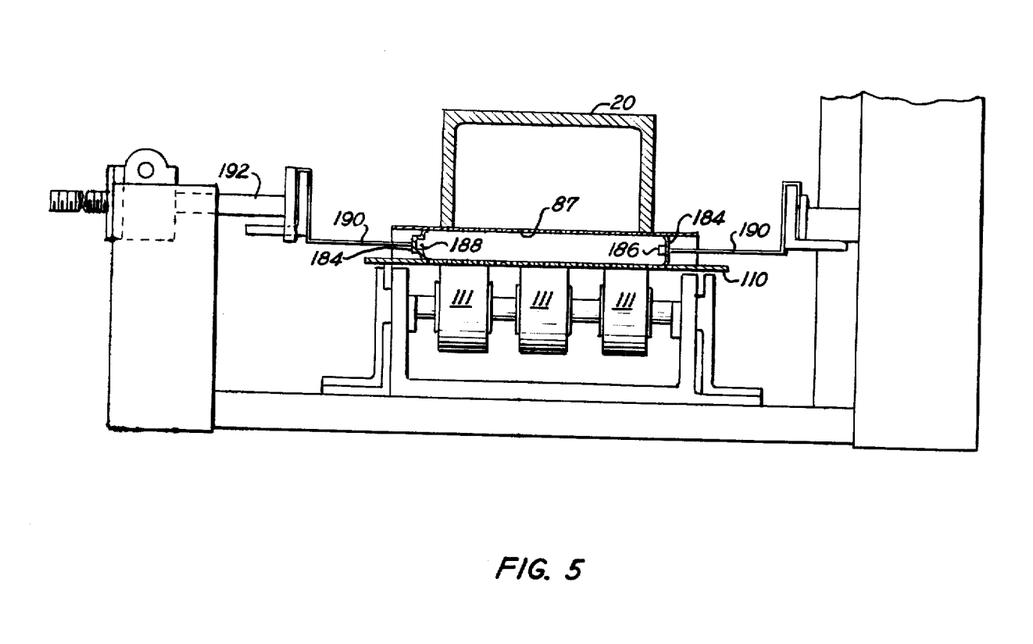
FIG. 5 is a modified view of a section taken on the line 5—5 of FIG. 3.

FIGS. 3 and 4 illustrate a 'one-belt' machine according to the structure herein. The molding channel is formed of a stationary plate and a supporting moving surface which may be longitudinal or arcuate, shown respectively in FIGS. 3 and 4. As shown in FIG. 3, an unwinding roll 28 upon which is mounted for unrolling a sheet 32 which may be perforated, but need not be, is filled with expandable plastic granules from a hopper 48 as in FIG. 1, and the plastic sheet and granules may be wrapped in a folding die 38 as in FIG. 6a, and passed between guide roller 108. FIG. 3 lightly presses the wrapped product against the forward end 109 of a lower conveyor belt 110. The upper surface of the conveyor belt supported on rollers 111 continuously moves and is supported about rollers 112 at the forward end and 114 at the after end, driven by a belt 116 from the pulley of a motor 118. The upper surface of the molding channel 87 through which the wrapped product 86 passes is a stationary plate. Consequently, the product 86 passes through a molding channel having a stationary upper surface formed by a stationary plate 87 having perforations therein and a movable lower surface comprising the belt 110. The side surfaces may be stationary, as shown in FIG. 5, or may be movable belts as shown in the Norrhede et al. patent and my earlier patents as listed above, or may be entirely or partially stationary as shown in my prior U.S. Pat. No. 3,427,372.

The roller 108 presses the product 86 against the forward end of a belt 110 and may merely shape the board 86 without significant compacting, the product being moved through the longitudinal molding channel by movement of the conveyor belt 110, overcoming the friction of the stationary plate 87 which may be coated with a friction reducing material, as described above A heating chamber 20 may be mounted above plate 87, both having perforations passing through the stationary plate 87 and is mounted so that a heating fluid such as steam may be passed into the chamber 20. The steam in chamber 20 enters by way of ducts 122, passes through the perforations in plate 87, and thence downward through the perforations in the laminated sheet 32 as it is wrapped around the expandable granular plastic particles. This heats, softens and expands them into foamed particles filling the wrapper 82 so that they cohere to each other and to the wrapper into a compact board as it passes through the molding channel.

Mounted adjacent to and downstream of the molding channel 20 is a cooling chamber 26, similarly mounted upon the lower plate 87 adjacent the molding channel, said lower plate being perforated, whereby the chamber 26 may apply cooling to the molded product as it passes through the molding channel below plate 87. The cooling is supplied either by drawing a vacuum thereon through chamber 26, ducts 124 being connected to a vacuum pump for reducing the pressure in chamber 26, and thus by evaporation, producing cooling within the product being molded under reduced pressure; or the chamber 26 may be used to apply cooling to the product by circulating a cooling medium such as water through ducts 124. Where water is used for cooling, plate 87, only adjacent to chamber 26, may be imperforate to allow only heat transfer for cooling the product. Alternately, a separate cooling chamber 26 may be mounted downstream as shown in FIGS. 4 and 6b, so that the product may be cooled first by applying suction in the vacuum chamber and then further cooled in another cooling chamber downstream thereof in which cold water is circulated for this purpose.

In the one-belt machine, as shown in FIG. 3, the molded product is moved through the molding chamber by the friction thereon supplied by the single belt 110, and the softened product may be further supported and reduced in dimension by tangential rollers 128, which may also serve in part to draw the wrapped product through the molding channel, one or both of the tangential rollers 128 having a belt and motor attached thereto to drive it. The plate 87 may have a friction-reducing coating thereon as pointed out above.

FIG. 4 shows a one-bit drum and plate type of machine in which the molding channel is arcuate as shown in my U.S. Pat. No. 3,427,372. For this purpose the one-belt corresponds to a cylindrical drum 130 as the moving surface, the drum being slowly rotated by a belt 132 extending from a pulley 131 on the drum to the pulley of a motor 134. An arcuate stationary perforated plate 136 is fixedly mounted concentric with the drum 130 to form an arcuate molding channel 138 therebetween of selected spacing for the desired thickness of the product molded. Sheet materials 140 and 142 may be perforated and are mounted respectively upon rollers 139 and 141, unwinding in the direction of the arrows and threaded to lie against, lining the inner and outer surface of the arcuate molding chamber 138.

Foamable granules are fed to the system through hopper 48 and passed by way of nozzle 144 into the molding channel 138 between the outer laminating sheet layers 140 and 142. The heating medium such as steam for preliminary heating to expand the granules is passed into the channel by way of nozzle 146 together with a measured supply of granules. The drum 130 is correspondingly rotated at a desired molding speed in the direction of the arrow. The circumferential surface of the drum 130 is smooth and polished and may or may not be perforated. The plate 130 on the other hand is perforated, comprising an arcuate foraminous stationary wall extending about one half the circumferential distance about the drum 130.

The perforated wall 136 forms an inner wall of a housing 148. The housing 148 has a lower wall closed at 150, forming a chamber 152 having an outlet 154, whereby chamber 152 may operate as a cooling chamber by drawing a vacuum through the outlet 154, whereby moisture may be withdrawn by suction from the molded product 86 formed in the mold channel 138, the expansion and evaporation of the moisture condensed therein such as the steam used in heating, producing a cooling of the product 86. The moisture passes through the perforation in the sheet 140 and thence to the vacuum chamber 152 and outward through outlet 154 connected to a vacuum pump [not shown]. A second chamber 156 disposed upstream of chamber 152 is separated therefrom by a partitioning wall 158. A second partition 160 closes the top of the chamber 156. A heating fluid such as steam may be passed through an inlet duct 162 into the chamber 156, passing thence through the perforated plate 136, into the molding channel 138, distributing steam through the perforated sheet of the foamable product passing in the molding channel further softening, expanding and molding the same.

Additional chambers 164 and 166 are also disposed upstream of the channel and may be used for intermediate cooling as by circulation of a cooling fluid through ducts 168 or effecting cooling by application of a vacuum applying suction through duct 170, depending upon whether the product was preliminarily heated by a heating fluid such as steam introduced through the nozzle 146.

Thus the nozzle 146 may be optionally used for preheating, pre-expanding and even molding of the granules, whereby it is useful then to preliminarily cool the pre-expanded granules as they are molded to seal and form the product as a preliminarily foamed material between the laminated sheets so that further heating and expansion and cohesion of the expanded granules may then be effected downstream by the heating medium introduced through the chamber 156. Alternately, the preliminary heating nozzle and cooling of the preheated product may be omitted. Thus the use of a cooling medium or applied vacuum in chambers 164 or 166 is optical, usually depending upon whether the granules are preliminarily foamed by introduction of a heating fluid through nozzle 146.

Pairs of upper and lower forming rollers 176 and 178 are mounted tangentially above and below the molded product sheet 86 as it emerges from the molding channel 138 which may frictionally engage as well as support the molded product, squeeze the same to a selected smaller dimension, as may be desired, and frictionally draw the product, aiding in the rotation of the drum 130 through the arcuate molding channel. For this purpose each of the rollers 176 and 178 or only some of them may have drive belts 180 passing around the pulley of driving motor 182 for pulling or drawing the soft molded laminated product through the mold channel and simultaneously squeezing the same to a smaller dimension as may be desired for the product. One effect is to move the molding drum more rapidly by pulling of the molded product through the molding channel and the motor 134 and belt 132 may have an overrunning clutch [not shown] which will permit the drum to be moved more rapidly than the speed normally supplied by motor 134.

If desired the unwinding rolls may be omitted and substituted with a single unwinding roll 28 to supply a sheet 32 to a folding die as shown in FIGS. 1 and 6a, whereby the sheet wraps the foamable granules as the wrapped product which is fed to the arcuate molding channel 138, the steam from nozzle 146 serving, like probe 158, to preliminarily expand the wrapped product.

As shown in FIG. 5, the underside of belt 110 has supporting rollers 111 mounted therebeneath to provide dimensional stability to the driving belt 110 and the laminated molded product 86 thereon which supports and presses the molded product against the stationary perforated plate 87. Stationary side seals 184 are mounted to encase the sides, the side seals 184 being shaped as a die to impart a corresponding shape to the edges of the molded product being shaped therein. For instance, one die provides a groove 186 for one side and a tongue 188 at the opposite side for assembly of the board in subsequent use as panels. Any other suitable or desirable side shape may be imparted to the sides, as desired. The side sealing dies 184 are supported from brackets 190 and are adjustably supported inward by threaded shaft 192, adjustable to the fixed side dimension desired for the width of the board being molded. These dies 184 may be short to extend only a portion thereof sufficient to provide a side impression or may extend to any desired length of the sides. While as shown the side seals are fixedly mounted, these may be modified as shown in my patent, supra, to be movable with the belt 110 for suitable side sealing thereof as desired.

In overall operation continuously foamable plastic is converted into a molded board or other desired shape continuously as a laminate, usually but not necessarily having both upper and lower sheets, in which the sheet is preferably perforated, whereby a heating medium, usually followed by cooling, is introduced through one or both sides of the board through perforations in the surface sheet materials. Preliminary steam probes may be supplied to preliminarily foam and expand the granules within the laminating sheets as the laminate is formed, the heating being applied preferably by introduction of the heating medium laterally from the side of the laminated board being formed through perforations in the protective sheet forming the laminate.

In the preferred form, the board is formed by being circumferentially wrapped with an outer protective sheet continuously fed and folded as a wrapper while it is being filled with granules which may be simultaneously expanded as they are wrapped in the sheet. The simultaneously packaged, expanded and foamed product is shaped and further heated as it continuously passes through a molding device.

As thus described, the laminated product may be formed in a two-belt machine defining a longitudinal or arcuate molding channel. It may also be formed in a one-belt machine having a longitudinal molding channel of which one surface is a moving belt and the other is a stationary plate. It may also be formed in a one-belt machine in which the molding channel is arcuate, the moving surface being a rotating drum and the stationary surface arcuate stationary plate, spaced from the moving drum. In each of these structures the product may be frictionally drawn through the machine, thus aiding the moving elements to move the product through the longitudinal or arcuate molding channels. The frictional gripping of the product by tangential rolls to move it usually serves also to adjust the dimensions of the molded product.

It is preferred to form the laminated product in a so-called no-belt machine, the packaged encased laminate being merely heated and compressed by rollers as it is initially folded in a die about an expandable granular filler, no additional molding channel being needed. The formed completely wrapped product or merely laminated product with upper and lower sheets is merely heated and compressed by rollers as it is drawn by the said rollers from the forming die through a heating and cooling zone, using the inherent strength of the wrapper to draw the heat softened and foam filled wrapped product from zone to zone as it is shaped, dimensionally adjusted and cooled to an integral finished product on passage through the molding device.

In the forming the product either or both of two sources of heat are supplied to foam and soften as well as cause the expandable granules to cohere to each other as well as to the encasing wrapper. The preliminary steam probe serves to preliminarily expand the product and is useful for this purpose. However, the product may already be preliminarily expanded partially before it is passed to the supply hopper as shown in my copending application, Ser. No. 270,669 filed July 11, 1972 and, consequently, the preliminary expansion may be omitted. It is generally preferred to use both sources of heat for even heat control and cohesion.

Where the heat is supplied laterally, it may enter through the top and be emitted through the lower perforations and for this purpose the upper and lower perforations may differ in size, as shown.

It is sometimes preferred to use a polystyrene sheet material as the outer encasing sheet, and for this purpose the outer sheet material may be a pre-foamed polystyrene sheet, variable in thickness and strength as needed. Where a heat softenable sheet material has been used, the initial folding of the sheet and subsequent heating will cause the overlapping edges to seal to each other as well as to the foamed product within the laminate.

Again, where the sheet is a heat softenable plastic which has been perforated, the entering steam will heat the sheet more at the side the steam enters, softening it first, and the steam may even destroy or seal the perforations on the entering side against the foamed filler so that the upper sheet originally perforated may, after sufficient heating, have the perforations sealed or closed after initial foaming by the heating fluid itself. This forms a glazed imperforate surface, in contrast to an opposite surface wherein the cooled steam emitted from usually larger perforations on the outlet side will not seal the perforations.

What is claimed is:

1. The method of producing a laminated foamed plastic body having at least one protective sheet secured to at least one surface thereof, said sheet being foraminous by including numerous perforations with large enough slots to allow easy passage of heating fluid through the surfaces, comprising molding a heat expandable granular material in surface contact with the preformed foraminous sheet and passing a heating fluid at least in part through the foraminous sheet and heat expandable granular plastic to expand and foam said granular plastic and cause the granules to cohere to each other and to said sheet material, and then cooling the molded product.

2. The method of continuously molding a laminated product comprising foamed heat expandable plastic granules containing a foaming agent as a laminate between sheets confining and supporting the foamed granules between them, comprising passing said granules between sheets together with a heating fluid to soften and expand said granules as a foam, cohering said granules to each other and to said confining sheets as a heat softened body, and molding and forming the heat softened body by pressing the laminate between confining surfaces to desired dimension, said laminating sheet reenforcing, strengthening and confining the expanded granules therebetween, and drawing the assembled laminate through said heating and dimension adjusting means continuously as the body is formed.

3. The method of forming a laminated foamed plastic body as defined in claim 1 comprising continuously folding a foraminous sheet having numerous perforations with large enough slots to allow easy passage of heating fluid through the surfaces to form upper and lower laminar sheet surfaces, passing heat expandable plastic granules as a filler into said folded sheet as an outer wrapper, and heating the assembly to soften and expand the foamable granules to fill the space between said folded sheets, cohering the expanded granules to each other and to the confining surfaces of said sheet as a laminated body.

4. The method as defined in claim 1 wherein the inner sheet surface is first coated with an adhesive suitable to bond the foamed plastic to said sheet.

5. The method as defined in claim 2 wherein the inner sheet surface is first coated with an adhesive suitable to bond the foamed plastic to said sheet.

6. The method as defined in claim 3 wherein the assembled sheet and expandable plastic filler therein is mechanically drawn through a forming and heating zone wherein the granules expand and cohere into an integral shaped body wrapped in said sheet as a laminate.

7. The method as defined in claim 3 wherein said sheet is perforated and is continuously folded into a wrapper, encasing said foamable granules, and the foamable granules and sheet are heated at least in part by heating fluid introduced through said perforations in said sheet.

8. The method as defined in claim 3 wherein said sheet is continuously folded into a wrapper encasing said foamable granules, and the foamable granules and sheet are heated at least in part by heating fluid introduced together with said granules within the confining wrapper to heat the particles therein sufficient to cause them to expand and to cohere to each other and to the encasing wrapper as a foamed body having a wrapper thereabout.

9. The method as defined in claim 3 wherein said sheet is perforated and is continuously folded into a wrapper encasing said foamable granules, and the foamable granules and sheet are heated in part by heating fluid introduced with said granules as they are emplaced within the wrapper and in part by heating fluid introduced laterally through the perforations in said sheet as the wrapped body is formed and foamed into a coherent molded product.

10. The method as defined in claim 6 wherein the heat softened laminate is cooled and the heat softened product is continuously drawn through said cooling means.

11. The method as defined in claim 1 wherein the sheet and foamed plastic in contact therewith are passed continuously through a longitudinal molding channel in which a heating fluid is introduced passing through said foraminous sheet and into contact with the foamable granular material therein to heat and expand the same, causing said granules to cohere to each other and to said sheet material.

12. The method as defined in claim 11 wherein said molded product is continuously mechanically drawn through said longitudinal molding channel.

13. The method as defined in claim 11 wherein said longitudinal molding channel is a channel formed between upper and lower perforated belts continuously supporting and moving said molded product therebetween.

14. The method as defined in claim 11 wherein said longitudinal molding channel is a channel formed between upper and lower confining surfaces of which only the lower surface is a movable belt operative to move the molded product through the channel.

15. The method as defined in claim 3 wherein the sheet is foraminous and the sheet and foamable plastic in contact therewith are passed continuously through an arcuate molding channel having closely spaced arcuate surfaces, at least one of said channel surfaces having perforations therein, and passing a heating fluid through said channel perforations and through the perforations of said sheet material to soften, expand, cohere the expanded granules to each other and to said sheet and mold the laminate as it passes through said channel.

16. The method as defined in claim 15 wherein the assembled sheet and expandable plastic filler therein is mechanically drawn through a forming and heating zone in said arcuate channel wherein the granules expand and cohere into an integral shaped body wrapped in said sheet as a laminate.

17. The method as defined in claim 15 wherein only one of said arcuate surfaces is movable, the opposite surface being stationary, said movable surface engaging said laminated product in said molding channel and moving the same therethrough.

18. The method as defined in claim 3 wherein the said sheet is perforated and the assembled sheet and foamable granules encased therein are passed through a longitudinal molding channel having perforations through at least one surface thereof, and passing a heating fluid through said perforations and through the perforations of said confining sheet into contact with said heat expandable granules to soften, expand and cohere the same to each other and to said confining sheet material, and then cooling said laminated product in said longitudinal molding channel.

19. The method as defined in claim 18 wherein the molded product is drawn through said molding channel.

20. The method as defined in claim 18 wherein the longitudinal molding channel is defined by perforated movable surfaces and the heating medium is introduced through said perforations.

21. The method as defined in claim 18 wherein the molding channel is defined by at least one movable surface, and at least one stationary surface, the molded product being moved through said channel by said movable surface.

22. The method as defined in claim 7 wherein the molding channel is arcuate, defined by closely spaced arcuate surfaces, at least one of said arcuate surfaces having perforations therein, and passing a heating fluid through said perforations and through the perforations of said confining sheet in contact with said heat expandable granules to soften, expand and cohere the same to each other and to said sheet material, molding and then cooling the heat softened product as it passes through said arcuate channel.

23. The method as defined in claim 1 wherein the perforated sheet has larger perforations on one surface than the perforations on an opposite surface, and the heating fluid is passed into said heat expandable particles from one surface and passes out of the assembly through the opposite perforated surface.

24. The method as defined in claim 1 wherein the laminating sheet is selected from the group consisting of plastic, paper, metal and asbestos.

25. The method as defined in claim 1 wherein the laminating sheet is polystyrene.

26. The method as defined in claim 1 wherein the foamable plastic granules are foamable polystyrene.

27. The method as defined in claim 1 wherein the plastic sheet is foamed polystyrene.

28. The method as defined in claim 2 wherein the product is molded in longitudinal movement through heating and dimensions adjusting means.

29. The method as defined in claim 2 wherein the product is molded in an arcuate molding movement through the heating and dimension adjusting means.

30. The method as defined in claim 3 wherein the product as it is molded is passed through stationary side guides which shape the sides of the product.

31. The method as defined in claim 30 wherein the product is a continuously formed board and the side guides shape the sides of the board into a tongue on one side and a groove on the opposite side, cooperatively dimensioned to interfit as tongue-in-groove foamed board.

* * * * *